Figure 5:
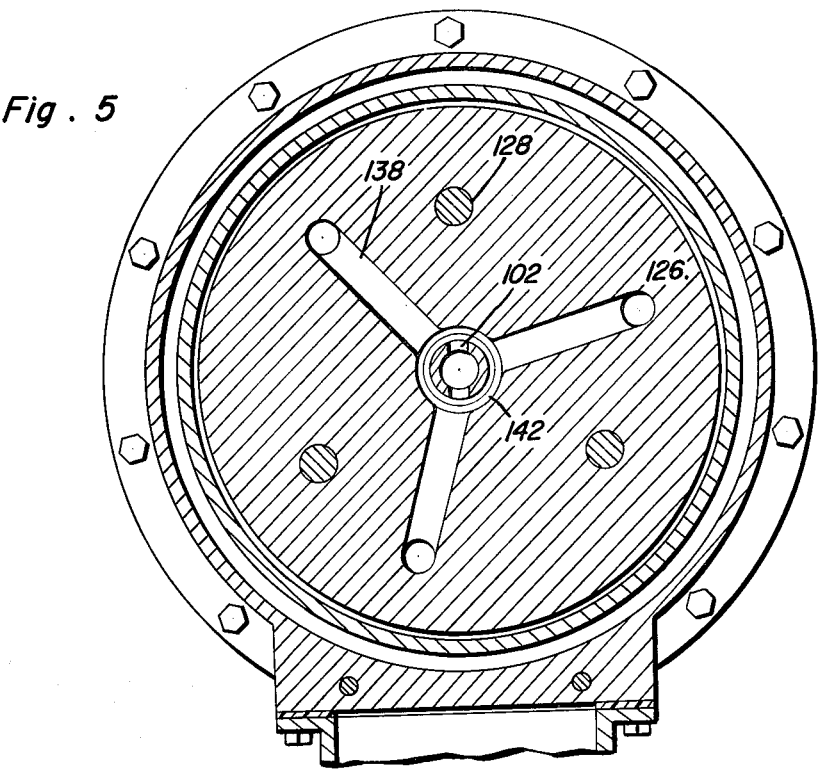

July 26, 1966  F. D. JACKSON  3,262,336
AUTOMATIC VARIABLE RATIO TRANSMISSION
Filed Oct. 11, 1963  3 Sheets-Sheet 1
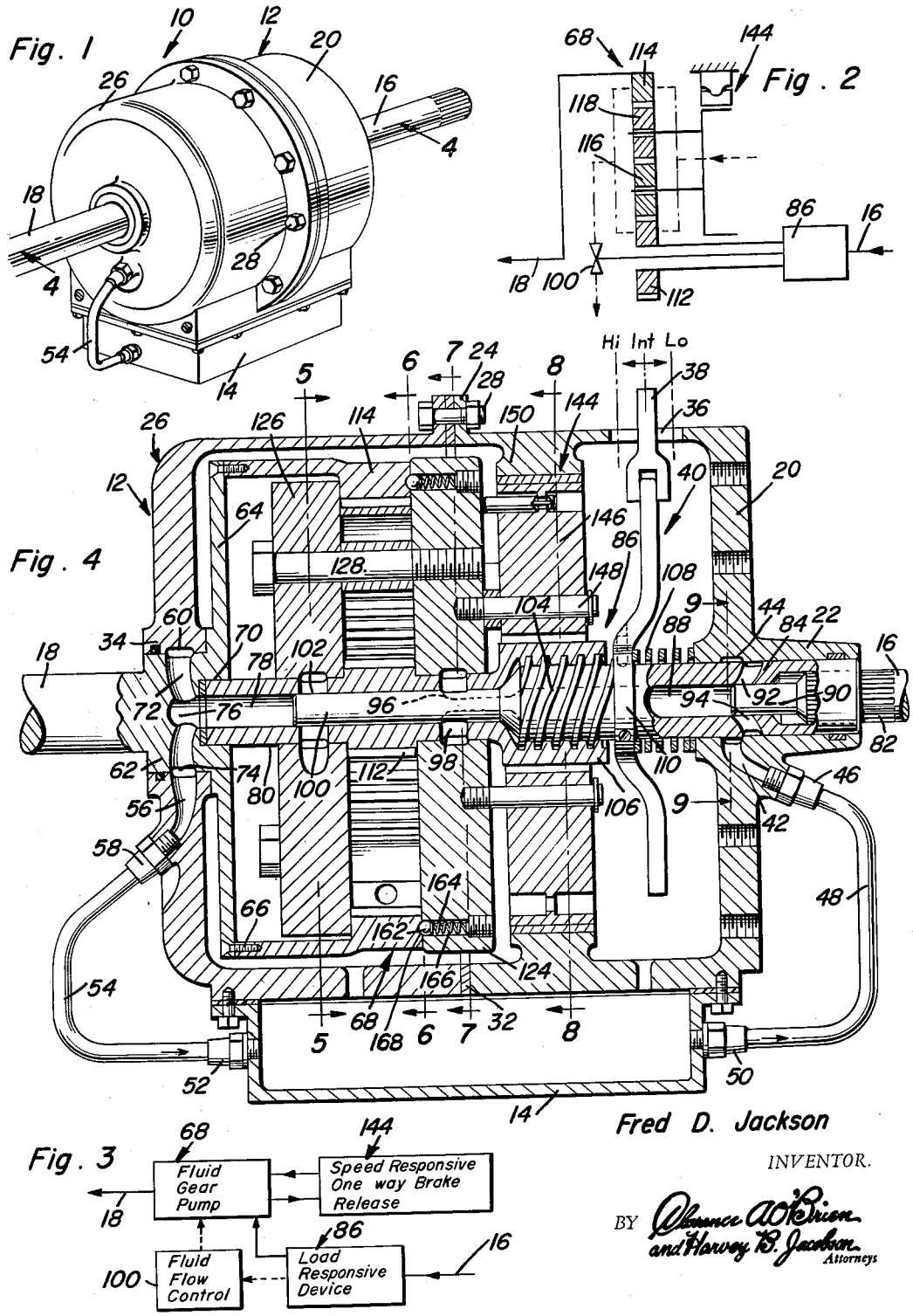
Fred D. Jackson
INVENTOR.
BY Clarence A. O'Brien
and Harvey B. Jacobson
Attorneys July 26, 1966   F. D. JACKSON   3,262,336
AUTOMATIC VARIABLE RATIO TRANSMISSION
Filed Oct. 11, 1963   3 Sheets-Sheet 2

Fred D. Jackson
INVENTOR.

July 26, 1966  F. D. JACKSON  3,262,336
AUTOMATIC VARIABLE RATIO TRANSMISSION
Filed Oct. 11, 1963  3 Sheets-Sheet 3
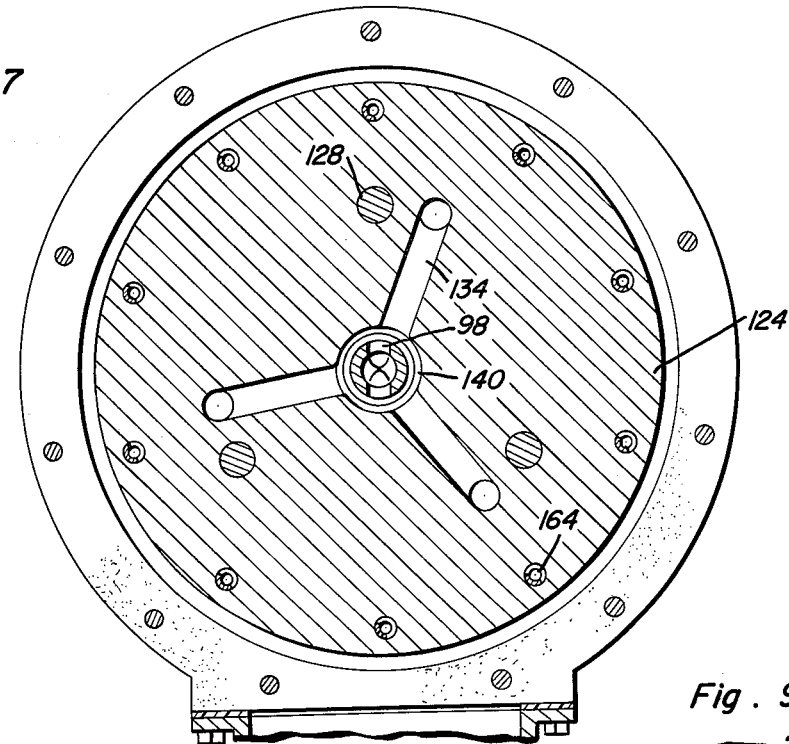
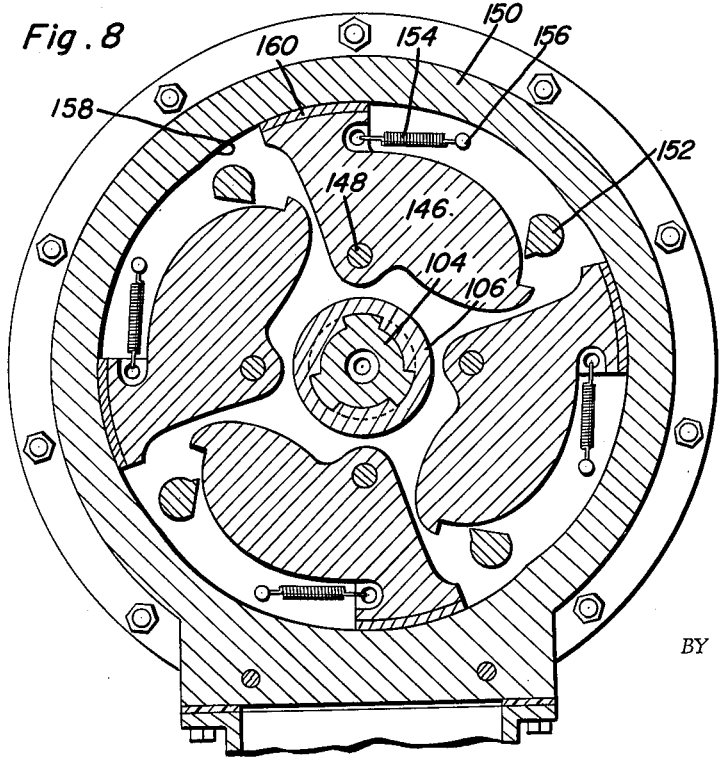
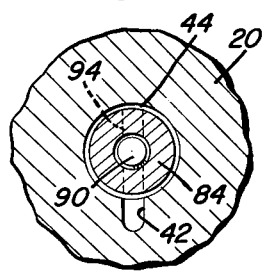
Fred D. Jackson
INVENTOR.

United States Patent Office 3,262,336
Patented July 26, 1966

3,262,336
AUTOMATIC VARIABLE RATIO TRANSMISSION
Fred D. Jackson, Hamilton, Tex., assignor of sixteen and two-thirds percent each to Gordon Griffin, Sr., Gordon Griffin, Jr., and Levie Old, all of Brownwood, Tex.
Filed Oct. 11, 1963, Ser. No. 315,521
10 Claims. (Cl. 74—751)

This invention relates to a variable speed transmission capable of being utilized for various purposes including automotive installation or wherever the transmission ratio is to be varied in accordance with output loading and input power.

It is therefore a primary object of the present invention to provide a variable speed transmission the drive ratio of which is infinitely variable between a relatively low or high reduction ratio and a relatively high drive ratio so as to instantenously accommodate output loading and input torque relationship.

In accordance with the foregoing object, the transmission of the present invention is capable of varying the drive ratio thereof in a smooth manner and with rapid response to varying loading condtions. It will therefore be apparent that the use of selectively engaged clutches and fluid transmitters are eliminated together with abruptness in ratio change and lag in response which have characterized transmissions employing the aforesaid components.

A still further object of the present invention is the provision of a transmission achieving the aforementioned objective with a relatively simple arrangement of parts and with relatively high efficiency.

The transmission of the present invention involves the transmission of power through a planetary gear assembly, the gear elements of which act as a positive fluid displacement pump so as to circulate fluid such as oil in a closed fluid circuit which is variably loaded in order to control the drive ratio through the gearing. Loading of the fluid circuit is achieved through a flow controlling valve the position of which changes in response to changes in the torque transmitted between the input member and the input gear element of the gearing. When the flow controlling valve completely blocks the fluid circuit, a locked up condition in the gearing exists so that power may be transmitted at a relatively high drive ratio. As the flow controlling valve is withdrawn from its flow blocking position, the drive ratio of the gearing is reduced. However, before the flow controlling valve is completely displaced so as to completely unblock the fluid flow and render the gear assembly inoperative, as would be the case under starting conditions, the control element of the gearing is engaged by a one-way brake so as to hold the gear assembly in a low drive ratio condition until the relationship between the output load and the input torque is restored to a condition wherein the fluid circuit is sufficiently loaded so that the gearing may operate without engagement of the one-way brake holding the control gear element. A speed responsive release device is therefore provided in conjunction with the one-way engaging brake so as to effect release thereof when rotation of the input member in one direction exceeds a predetermined minimum value. Also, the transmission is provided with facilities for retarding relative rotation between the output gear element and the control gear element so as to prevent reduction in the speed ratio from the one to one value until a predetermined torque differential exists between the output and input. The transmission may also be provided with manual over-control facilities so that the drive ratio of the transmission may be held either at its high or low ratio.

Figure 6:
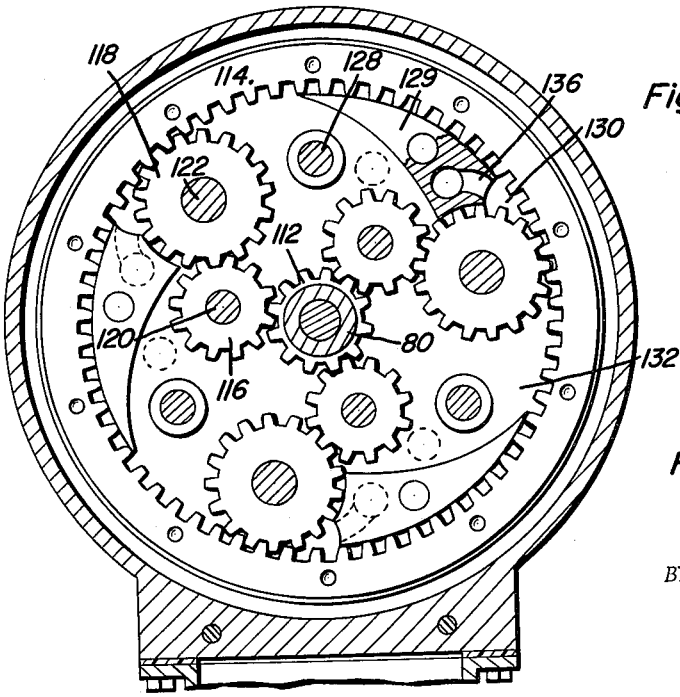

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the transmission.
FIGURE 2 is a diagrammatic view of the transmission.
FIGURE 3 is a schemtaic diagram illustrating the underlying principles of the transmission.
FIGURE 4 is a longitudinal sectional view of the transmission taken substantially through a plane indicated by section line 4—4 in FIGURE 1.
FIGURE 5 is a transverse sectional view taken through a plane indicated by section line 5—5 in FIGURE 4.
FIGURE 6 is a transverse sectional view taken through a plane indicated by section line 6—6 in FIGURE 4.
FIGURE 7 is a transverse sectional view taken through a plane indicated by section line 7—7 in FIGURE 4.
FIGURE 8 is a transverse sectional view taken through a plane indicated by section line 8—8 in FIGURE 4.
FIGURE 9 is a partial sectional view taken substantially through a plane indicated by section line 9—9 in FIGURE 4.

Referring now to the drawings in detail, it will be observed from FIGURES 1 and 4, that the transmission generally referred to by reference numeral 10 includes a two-part housing generally referred to by reference numeral 12 below which there is mounted a fluid reservoir or tank 14. Extending from one end of the housing is an input shaft 16 axially aligned with an output shaft 18 extended from the opposite end of the housing. The housing may be made up of two sections including the forward section 20 having an axially extending journal portion 22 into which the input shaft extends. The forward section 20 is further provided with a connecting flange portion 24 adapted to be secured to the rear housing section 26 by a plurality of fastener assemblies 28 which also extend through a flange portion 30 on the housing section 26 and a sealing gasket 32 disposed between the flange portions 24 and 30. The rear housing section 26 is therefore provided with a hub portion 34 through which the output shaft 18 extends. The forward section 20 of the housing may also be provided with an opening 36 through which a shifting fork 38 extends associated with a manual over-control device 40 whereby the transmission may be conditioned for operation in either a low or high drive ratio. Also provided in the end wall of the housing section 20, as more clearly seen in FIGURES 4 and 9, is a fluid passage 42 that extends from an annular internal groove 44 formed in the journal portion 22 of the housing section 20. The passage 42 communicates through the fitting 46 with a conduit 48 connected by the fitting 50 to the forward end of the fluid reservoir 14. The rear end of the reservoir 14 is connected by the fitting 52 to a conduit 54 conducting fluid from a fluid passage 56 formed in the rear housing section 26. The passage 56 is therefore connected to the conduit 54 by the fitting 58 to thereby complete a fluid circulating system. The passage 56 is connected to an annular internal groove 60 formed in the hub portion 34 of the rear housing section 26.

The output member 18 is connected to a hub portion 62 journalled in the hub portion 34 of the rear housing section 26. The hub portion 62 is connected to a circular plate portion 64 by means of which the output shaft 18 is connected by a plurality of fasteners 66 to a planetary gear assembly 68 disposed within the housing. The hub portion 62 is provided with a central socket 70 for rotatable support of the gear assembly 68 and to establish fluid communication therewith through fluid passages 72 which extend from an annular groove 74 mating with the internal annular groove 60 in the housing hub 34. The passages 72 are connected at the radially inner ends to a central opening 76 which in turn communicates with the axial passage 78 in the hollow shaft member 80 rotatably mounted in the supporting socket 70. The gear assembly 68 is thereby maintained in co-axial relationship with the output shaft 18 and the input shaft 16. The input shaft 16 is provided with a spline portion 82 slidably projected into a slidable actuating shaft 84 forming part of a torque responsive control device generally referred to by reference numeral 86.

The shaft 84 of the torque responsive control device 86 is provided with an axial passage 88 closed by the end portion 90 of the input shaft 16. Formed in the shaft 84, are radially extending passages 92 communicating with an annular groove 94 which mates with the internal annular groove 44 formed in the housing section 20 to which the passage 42 is connected. Accordingly, fluid communication is established by the conduit 48 between the reservoir 14 and the axial passage 88. The axial passage 88 is connected at its inner end to radial passages 96 so that fluid communication may be established with the gear assembly 68 through radial passages 98 when the flow controlling valve portion 100 is displaced from its position illustrated in FIGURE 4 so as to align the passages 96 with the passages 98. At the same time, the passages 102 in the shaft member 80 will be opened to the axial passage 78 so that the fluid circuit may be opened and extend through the gear assembly 68 through which the fluid is pumped for circulation. It will therefore be apparent, that displacement of the flow controlling valve portion 100 from the illustrated position in FIGURE 4 will unblock fluid flow and depending upon its displaced position, variably load the fluid circuit until it reaches a position completely unlocking the passages 98 and 102 so as to unload the fluid circuit. Toward this end, the actuating shaft 84 is provided with a threaded portion 104 which is threadedly engaged with internal threads in an axially fixed nut portion 106 secured to one end of the shaft 80 through which the flow controlling valve portion 100 is slidably mounted. The shaft 84 and the valve portion 100 connected thereto is biased toward the valve closing position illustrated in FIGURE 4 by a spring 108 reacting between the portion 22 of the housing section 20 and a shifting collar 110 secured to the shaft 84. It will therefore be apparent, that when the torque transmitted from the input shaft 16 through the shaft 84 to the shaft 80 exceeds a predetermined value, so as to cause relative rotation between the shaft 84 and the shaft 80, the shaft 84 will be axially shifted because of the threaded engagement between the threaded portion 104 and the nut portion 106, against the bias of the spring 108 and thereby also axially shift the valve portion 100 so as to unblock and variably load the fluid circuit as hereinbefore indicated. When desired, the shaft 84 may be manually shifted by means of the over-control device 40 so that it will be held in either of its axial limit positions in order to hold the transmission in either a high or low drive ratio condtion as will be hereafter further explained.

Referring now to FIGURES 4 and 6 in particular, it will be observed that the planetary gear assembly 68 is provided with a central sun gear 112 formed intermediate the axial ends of the shaft 80. The sun gear 112 is therefore rotatably mounted in axial alignment between the output shaft 18 and the input shaft 16. Rotation in one direction as for example a clockwise direction as seen in FIGURE 6 may therefore be imparted to the sun gear 112 as the input element by the input shaft 16. Rotatably mounted in co-axial relation to the sun gear 112, as the output gear element, is an internal orbit gear 114 which is connected by the fasteners 66 to the plate portion 64 of the output shaft as hereinbefore indicated. Three sets of intermeshing planet gears including the planet gears 116 and 118 respectively mesh with the sun gear 112 and the orbit gear 114. The planet gears are rotatably mounted on spindles 120 and 122 which are connected to a planetary carrier assembly formed by axially spaced disc members 124 and 126. The disc members are interconnected by spacer bolts 128 so as to hold assembled therebetween the sun gear, orbit gear and intermeshing planet gears. The planet carrier assembly is however rotatable with respect to the sun gear 112 and shaft 80 and the orbit gear 114. Also mounted between the disc members 124 and 126 and rotatable therewith, are fluid flow passage blocks 129 which form fluid spaces 130 between the teeth of the orbit gear 114 and the external teeth of the planet gear 118. Accordingly, relative rotation between the orbit gear 114 and the planet gear 118 is operative to displace fluid through the spaces 132. Accordingly, fluid from the reservoir is displaced into the spaces 132 which are in communication with the radial passages 134 formed in the disc member 124 as more clearly seen in FIGURE 7. The spaces 130 on the other hand, communicate with passages 136 within the passage blocks 129, the passages 136 communicating in turn with radial passages 138 formed in the disc member 126 as more clearly seen in FIGURE 5. The radial passages 134 and 138 in the carrier disc members are respectively connected with radially inner grooves 140 and 142 aligned with the passages 98 and 102 in the shaft 80. Accordingly, relative rotation between the gear elements of the gear assembly will pump fluid by positive displacement through a closed fluid circuit, the amount of pumping action depending upon the relative rotation between the gear elements. When however the fluid circuit is blocked by the flow controlling valve portion 100 as illustrated in FIGURE 4, no fluid displacement may occur so that the gear elements will be locked up to thereby render the gear assembly operative to transmit power at a one to one drive ratio. By variably loading the fluid circuit however when the passages are partially unblocked by the valve portion 100, the amount of relative rotation may be governed which in turn determines the drive ratio of the gear assembly. It will therefore be apparent, that as the passages are unblocked to an increasing degree by the flow controlling valve portion 100, the drive ratio through the gearing is reduced from the one to one value until the fluid circuit is completely unloaded at which point, the gearing would idle without any effective transmission of power. This idling condition however, does not occur because of a releasable one-way brake device 144 associated with the planetary assembly.

Referring now to FIGURES 4 and 8 in particular, it will be observed that the releasable one-way brake device includes a plurality of brake shoe members 146 pivotally mounted on the carrier disc member 124 by the studs 148. The brake shoe members 146 are therefore disposed in axial alignment with the nut portion 106 and are limited in pivotal displacement from a position engaging stationary portion 150 projecting radially inwardly from the housing section 20 to a position engaging the stop elements 152. The shoe members are urged into engagement with the stationary member 150 by spring elements 154 connected thereto and anchored by pins 156 secured to the carrier disc member 124. The internal surface 158 of the stationary member 150 is so contoured that counterclockwise rotation of the carrier disc member 124 as viewed in FIGURE 8, would brake the carrier disc member by engagement with the friction brake lining 160 on the radially outer portion of the brake shoe members 146. Clockwise rotation of the carrier disc member on the other hand, will be permitted since the brake shoe members will then be pivotally displaced in a counterclockwise direction as viewed in FIGURE 8 against the bias of the spring elements 154 until the brake shoe members engage the stop elements 152. It will also be apparent, that rotation of the carrier disc member in a clockwise direction will produce centrifugal force on the brake shoe members which will tend to pivotally displace the brake shoe members in a counterclockwise direction about the pins 148 in order to assist and then completely disengage the brake shoe members from the stationary member after a predetermined speed is attained. It will therefore be apparent, that the releasable one-way brake device 144 will be operative to hold the carrier assembly stationary in order to condition the gear assembly for a low drive or high reduction ratio when the fluid circuit is completely unblocked since then the input element will be driven in a direction tending to cause counterclockwse rotation of the carrier assembly, which counterclockwise rotation renders the brake device 144 effective. However, when the load on the output shaft is reduced by a sufficient amount so that the carrier assembly may begin rotation in the same direction as the input element, the brake device will be released, but at this time the fluid circuit will be partially blocked so that power may be transmitted through the gear assembly. Under these latter conditions, forward or clockwise rotation of the carrier will be retarded but not prevented by the brake shoe elements until the speed thereof is sufficient to cause complete disengagement of the brake shoe elements as aforementioned.

It will be apparent that partial unblocking of the fluid circuit so as to unlock the gear elements by permitting the gear teeth to displace fluid through the fluid circuit, relative rotation will occur in response to a predetermined torque differential relationship between the shaft 80 and the shaft 84 respectively connected to the gear assembly and the input shaft. However, in order to prevent relative rotation between the gear elements and reduction in the drive ratio of the gear assembly until a minimum torque differential exists, a plurality of retarding ball elements 162 are disposed in circumferentially spaced relation in axial passages 164 as more clearly seen in FIGURES 4 and 7, these elements 162 being biased by springs 166 so as to seat the elements in pockets 168 formed in the axial end of the orbit gear abutting the carrier disc 124. Accordingly, a relatively light resistance will be offered to relative rotation between the carrier assembly and the orbit gear in order to maintain the gear assembly in a one to one drive ratio condition until adequate torque differential exists.

From the foregoing description, the construction, operation and utility of the transmission will be apparent. It will therefore be appreciated, that under starting conditions with the output shaft 18 loaded, torque applied to the input shaft 16 will produce axial displacement of the shaft 84 splined thereto inasmuch as the gear assembly will be in a locked up condition so that the shaft 80 and the nut portion 106 connected thereto will be held stationary by the load on the output shaft. The fluid passages will then become completely unblocked and rotation will be imparted to the sun gear 112 in a clockwise direction as viewed in FIGURE 6. In view of the loading imposed on the gear assembly by the output shaft 18, there will be a tendency for the carrier assembly to rotate in a counterclockwise direction so that the one-way brake device 144 will engage to hold the carrier assembly stationary thereby conditioning the gearing for a low drive ratio dependent upon the relative number of teeth of the sun gear 112 and orbit gear 114. A high driving torque may thereby be transmitted from the input shaft 16 to the output shaft 18 in order to start movement of the output shaft. As the output torque loading reduces in value relative to the input torque, the torque responsive device 86 will respond accordingly in order to axially shift the flow controlling valve portion 100 to a partial blocking position in order to increase the drive ratio by loading the fluid circuit. When the loading on the output shaft relative to the torque input reaches a predetermined value, the carrier assembly will begin to rotate in a forward direction or clockwise as viewed in FIGURE 6 and the brake device 144 will be ineffective so that torque respon-sive control over the drive ratio may thereafter be effective. Finally, when the relative output loading normally associated with crusing speed has been attained, the fluid passages will be blocked by the flow controlling valve 100 so that the gear assembly will be in a locked-up condition transmitting power at a one to one ratio. It will however be appreciated, that a certain amount of fluid leakage occurs for which reason the retarding elements 162 are provided in order to maintain the gear assembly in a locked-up condition until relative torque conditions are such as to require reduction in the drive ratio.

The foregoing is considered as illustrative only of the principles of the invention. Further, since numerous modifications and changes will readily occur to those skilled in the art, it is not desired to limit the invention to the exact construction and operation shown and described, and accordingly all suitably modifications and equivalents may be resorted to, falling within the scope of the invention as claimed.

What is claimed as new is as follows:

1. A variable speed transmission comprising an output member, input means, gear means drivingly interconnected with said output member and said input means, torque responsive control means operatively connected to the gear means and the input means for reducing the drive ratio of the gear means from a relatively high drive ratio in response to an increase in torque differential between the output member and the input means, one-way engaging means operatively connected to the gear means for holding the gear means operative at a relatively low drive ratio in response to rotation of the input means in one direction and speed responsive release means operatively connected to said one-way engaging means for disengagement thereof in response to rotation of said input means above a predetermined speed to permit variation of the drive ratio by the torque responsive control means.

2. The combination of claim 1 including, means operatively connected to the gear means for retarding reduction in the drive ratio thereof from said relatively high ratio.

3. The combination of claim 2 including, selective overcontrol means operatively connected to torque responsive control means for alternatively holding the gear means operative in said high and low ratios.

4. The combination of claim 3 wherein said gear means comprises, a planetary gear assembly having drivingly related input, output and control elements, said output element being connected to the output member, said input element being connected to the torque responsive control means and said control element being connected to the one-way engaging means.

5. The combination of claim 4 wherein said torque responsive control means comprises fluid displacing elements operatively connected to said gear means, fluid circulating means operatively connected to the gear means for pumping of fluid through a closed fluid circuit by the fluid displacing elements, flow control means movably mounted by the input element of the gear means for interrupting said fluid circuit to hold the drive ratio of the gear means at said high ratio, and torque responsive actuating means operatively connecting said input element to the input means for displacing the flow control means in accordance with torque transmitted between the input means and the input element to variable load the fluid circuit.

6. The combination of claim 5, wherein said one-way engaging means comprises, a stationary member, and brake shoe means movably mounted on the control element of the gear means for engagement with the stationary member in response to rotation thereof to prevent idling of the gear means upon rotation of the input means in said one direction.

7. The combination of claim 1 wherein said gear means comprises, a planetary gear assembly having drivingly related input, output and control elements, said output element being connected to the output member, said input element being connected to the torque responsive control means and said control element being connected to the one-way engaging means.

8. The combination of claim 7 wherein said torque responsive control means comprises fluid displacing elements operatively connected to said gear means, fluid circulating means operatively connected to the gear means for pumping of fluid through a closed fluid circuit by the fluid displacing elements, flow control means movably mounted by the input element of the gear means for interrupting said fluid circuit to hold the drive ratio of the gear means at said high ratio, and torque responsive actuating means operatively connecting said input element to the input means for displacing the flow control means in accordance with torque transmitted between the input means and the input element to variable load the fluid circuit.

9. The combination of claim 8, wherein said one-way engaging means comprises, a stationary member, and brake shoe means movably mounted on the control element of the gear means for engagement with the stationary member in response to rotation thereof to prevent idling of the gear means upon rotation of the input means in said one direction.

10. A variable speed transmission comprising an output member, input means, gear means drivingly interconnected with said output member and said input means, torque responsive control means operatively connected to the gear means and the input means for reducing the drive ratio of the gear means from a relatively high drive ratio in response to an increase in torque differential between the output member and the input means, means for limiting variation of the drive ratio by the torque responsive control means between a minimum and a maximum value of torque differential, means for holding the gear means operative at a relatively low drive ratio when the torque differential exceeds said maximum value, and means responsive to rotation of the input means above a predetermined speed for disabling the holding means.

References Cited by the Examiner
UNITED STATES PATENTS

| 1,909,607 | 5/1933 | Blackstock | 74—751 |
| 1,997,788 | 4/1935 | Freidell | 192—54 |
| 2,123,430 | 7/1938 | Kuehnell | 74—751 |
| 2,475,700 | 7/1949 | Dickens | 192—54 |
| 2,701,974 | 2/1955 | Miller | 74—75 |
| 2,972,909 | 2/1961 | Miller | 74—75 |
| 3,051,021 | 8/1962 | Miller | 74—7 |

DAVID J. WILLIAMOWSKY, *Primary Examiner.*

T. C. PERRY, *Assistant Examiner.*